United States Patent [19]

Beckë et al.

[11] Patent Number: 5,797,430
[45] Date of Patent: Aug. 25, 1998

[54] ADAPTIVE HYDROPNEUMATIC PULSATION DAMPER

[75] Inventors: Wolfgang Beckë ; Joachim Esser, both of Aachen; Heiko Bublitz; Uwe Kooths, both of Stuttgart; Oliver Trecker, Wiesbadeu, all of Germany

[73] Assignee: Mercedes-Benz AG, United Kingdom

[21] Appl. No.: 704,369

[22] Filed: Aug. 28, 1996

Related U.S. Application Data

[63] Continuation of Ser. No. 612,073, Mar. 7, 1996, abandoned, which is a continuation of Ser. No. 254,080, Jun. 6, 1994, abandoned.

[30] Foreign Application Priority Data

Jun. 4, 1993 [DE] Germany .................. 4318553.3

[51] Int. Cl.$^6$ .................................................. F16L 55/04
[52] U.S. Cl. ........................ 138/30; 138/31; 138/26
[58] Field of Search ............................... 138/26, 30, 31; 417/540

[56] References Cited

U.S. PATENT DOCUMENTS

| | | | |
|---|---|---|---|
| 1,830,869 | 11/1931 | Charles | 138/30 |
| 2,290,337 | 7/1942 | Knauth | 138/30 |
| 2,773,455 | 12/1956 | Mercier . | |
| 2,852,033 | 9/1958 | Orser | 138/30 |
| 2,919,715 | 1/1960 | Rockwell | 138/30 |
| 2,949,932 | 8/1960 | Hewitt | 138/30 |
| 3,033,552 | 5/1962 | Ogden | 138/30 |
| 3,061,039 | 10/1962 | Peters | 138/30 |
| 3,103,234 | 9/1963 | Washburn | 138/30 |
| 3,220,191 | 11/1965 | Berchtold | 138/30 |
| 3,474,830 | 10/1969 | Hertell | 138/30 |
| 3,853,147 | 12/1974 | Cibulka | 138/30 |
| 3,933,172 | 1/1976 | Allen | 138/30 |
| 4,088,154 | 5/1978 | Patton et al. . | |
| 4,163,461 | 8/1979 | Jacobellis . | |
| 4,205,637 | 6/1980 | Ito et al. | 138/30 |
| 4,312,382 | 1/1982 | Gebauer | 138/30 |
| 4,383,551 | 5/1983 | Lynch et al. | 138/30 |
| 4,514,151 | 4/1985 | Anders et al. | 417/540 |
| 4,750,523 | 6/1988 | Crouse | 138/30 |
| 4,995,304 | 2/1991 | Daimler . | |
| 4,997,009 | 3/1991 | Nikura et al. | 138/30 |
| 5,070,983 | 12/1991 | Leigh Monstevens et al. . | |
| 5,353,840 | 10/1994 | Paley | 417/540 |
| 5,447,142 | 9/1995 | Bailey | 138/30 |
| 5,624,105 | 4/1997 | Runkel | 138/31 |

FOREIGN PATENT DOCUMENTS

| | | |
|---|---|---|
| 94107744 | 2/1995 | European Pat. Off. . |
| 2505856 | 2/1975 | United Kingdom . |
| 2905887 | 2/1979 | United Kingdom . |
| 2910025 | 3/1979 | United Kingdom . |
| 3317442 | 5/1983 | United Kingdom . |

*Primary Examiner*—Patrick F. Brinson
*Assistant Examiner*—James F. Hook
*Attorney, Agent, or Firm*—Evenson, McKeown, Edwards & Lenahan, P.L.L.C.

[57] ABSTRACT

An adaptive hydropneumatic pulsation damper is especially suited for hydraulic systems subject to pulsation with a strongly variable operating pressure. Because of good damping action, the pulsation damper makes a hydraulically firm coupling possible between hydraulic system elements, e.g., a pressure source and a consumer.

17 Claims, 4 Drawing Sheets

ADAPTIVE HYDROPNEUMATIC PULSATION DAMPER

This is a continuation of application Ser. No. 08/612,073, filed Mar. 7, 1996, now abandoned, which is a continuation of application Ser. No. 08/254,080, filed on Jun. 6, 1994, now abandoned.

BACKGROUND AND SUMMARY OF THE INVENTION

The present invention relates to an adaptive hydropneumatic pulsation damper for hydraulic systems subject to a variable operating pressure, especially hydraulic systems with a pulsating pump, where the gas or vapor medium is subjected to the pulsations of the hydraulic medium. The damper is enclosed within a chamber filled with gas or vapor and is coupled to the hydraulic system to form a volumetrically elastic cushion adaptable to the hydraulic pressure.

In a damper shown, for example, in German Patent No. DE 2,505,856 B2, a tubular membrane is fluidically coupled with a second membrane which forms part of the wall of an air chamber. When the tubular membrane executes movements, the second membrane executes analogous movements. Consequently, the volume of the air chamber increases or decreases depending upon the direction of the movements of the second membrane which is mechanically coupled with a control valve, by way of which the air chamber can be connected to a source of compressed air or an exhaust. When, on one hand, the second membrane moves sufficiently far in the direction causing the volume of the air chamber to decrease, the air chamber is connected to the compressed air source for the additional introduction of air. When, on the other hand, the second membrane moves sufficiently far in the opposite direction, air is released from the air chamber. In this manner, it is possible that the air pressure in the air chamber and the hydraulic pressure are maximally equal when the tubular membrane and especially the second membrane are in a medial or normal position.

In the embodiment of the damper described in German Patent No. DE 2,505,856 B2, the tubular membrane is fluidically coupled with two additional membranes, both of which are impacted with pressure from the air chamber on the side opposite the tubular membrane only one of these additional membranes, however, forms part of the wall of the air chamber. The space outside the other additional membrane and opposite the tubular membrane is coupled with the air chamber, via a longer pressure line, and can be connected to a source of compressed air or with an exhaust via an on-off valve controlled by this other additional membrane. In the final analysis, the same function is realized by way of the introduction and venting of air, with the volume of air in the air chamber being kept essentially constant even with varying hydraulic pressures.

It is disadvantageous that the membrane required for damping the pulsations must also provide the actuating power for the on-off valve and therefore have hampered mobility. As a result, the attainable damping effect is reduced. Furthermore, such a system is in principle not feedback-free, i.e., resonancers can be relatively easily excited, whereupon the membrane coupled with the on-off valve alters the pressure in the air chamber while intensifying the resonance oscillations.

Another known damper is described in German Patent No. DE 3,317,442 A1 and is intended for hydraulic systems that carry fluids with a component with a high vapor pressure, e.g., an aqueous solution enriched with ammonia. The vapor formed in a collection chamber for this fluid is carried via a vapor conduit to a vapor-filled chamber, the walls of which are formed, for example, by a membrane, of which the side opposite this chamber is impacted by the fluid. The connection between the vapor-filled chamber and the vapor zone of the collection chamber for the fluid ensues, via passively controlled valves, such that the membrane responds to lifting movements in the manner of a displacement-type instrument, with a limited overpressure vis-a-vis the vapor zone of the collection chamber for the fluid being established in the vapor-filled chamber.

Aside from the fact that this known arrangement is suited only for fluids containing a component with a high vapor pressure, the construction cost is quite high. Furthermore, under unfavorable conditions, undesirable feedback effects can occur here as well.

German Patent No. DE 2,910,025 A1 describes a hydropneumatic pulsation damper in which a chamber filled with gas or vapor is sealed off from the outside and the quantity of the enclosed vapor or gas is not, or at least not quickly, alterable. Accordingly, a membrane sealing the chamber filled with vapor or gas and impacted on one side by the hydraulic medium is maintained in one of its end positions by the given differential between the hydraulic medium and the vapor or gas. The parts of the membrane subjected to the pressure differential are extremely thick, as a result of which the flexibility of these membrane areas is severely restricted. Apart from the fact that this damper is not capable of functioning under substantial pressure differentials because the membrane would then remain in one of its end positions, the damping action is also limited, due to the restricted flexibility of the membrane when the values of vapor or gas pressure and of the hydraulic pressure approach each other.

Finally, a pressure reservoir or membrane-expansion container is described in German Patent No. DE 2,905,887 A1 and essentially consists of a compressed-gas chamber containing a bellows having an interior serving to receive hydraulic medium from a hydraulic system communicating therewith. With increasing hydraulic pressure, the volume of the bellows increases to receive comparably greater quantities of the hydraulic medium with the gas in the pressure chamber being compressed accordingly.

An object of the present invention is to provide a pulsation damper which ensures good operating conditions at variable hydraulic operating pressures. In particular, the pulsations are effectively damped while permitting rapid changes of the hydraulic working or operating pressure.

This object has been achieved in accordance with the present invention by impacting a volumetrically elastic cushion with the pressure of the hydraulic system via a relatively unthrottled route. This permits displacement of a minimum quantity of the hydraulic medium, as well as via a throttled route, which allows the displacement of great quantities of the hydraulic medium.

The present invention is based upon the recognition of coupling the volumetrically elastic gas or vapor cushion with the hydraulic system via two different routes which have extremely different throttling effects, while both are configured so that, at least briefly, they permit the displacement of only small quantities of the hydraulic medium. This ensures that, for a brief time, the pulsation damper can receive only small quantities of the hydraulic medium from the hydraulic system, i.e., that it has a slight "absorption capacity." This has the desired result that rapid changes in the operating pressure of the hydraulic system are possible by way of inletting or outletting small quantities of the hydraulic medium to or from a consumer without impairment by the pulsation damper. The hydraulic pressure source and the hydraulic consumer can therefore be readily coupled together hydraulically in a "rigid" fashion.

Despite this rigid hydraulic coupling made possible by the invention, the volumetrically elastic gas or vapor cushion of the pulsation damper of the invention can, by suitable dimensioning of its volume, provide a great resilience, i.e., a low deflection rate, as is desirable in light of effective pulsation damping. Via the throttled route which, although permitting only a low flow rate and accordingly only a minimal flow of the hydraulic fluid, nevertheless makes possible the displacement of great quantities of the hydraulic medium, adequate displacement of the hydraulic medium can always be ensured in the long run to allow a change in the volume in order to adapt to the medial operating pressure in the hydraulic system.

The relatively unthrottled route can thus provide a good oscillation-related coupling between the gas or vapor cushion and the hydraulic system without the need for the displacement of greater quantities of the hydraulic medium via this unthrottled route during changes in the working or operating pressure. Accordingly, the throttled route serves to adapt the gas or vapor cushion to the hydraulic working operating pressure, while the unthrottled route is provided exclusively for oscillation-related coupling between the gas or vapor cushion and the hydraulic system.

In one advantageous embodiment of the present invention, the relatively unthrottled route for a membrane is configured as a type of barrier limiting the quantity of the unthrottled hydraulic medium between stop faces and delimiting the mobility of the membrane. Therefore, the movement space of this membrane need be dimensioned only slightly greater than the movement amplitudes of the membrane caused by the pressure pulsations. The membrane can be impacted on one side by the gas or vapor medium and accordingly form a barrier between the hydraulic medium and the gas or vapor medium at the same time.

It is also advantageous, however, that this membrane be so arranged that it is impacted on both sides by the hydraulic medium while separating two hydraulic areas communicating via the throttled route. One of the hydraulic areas is situated in the chamber filled with gas or vapor or communicates therewith, relatively free of throttling, and the other hydraulic area is situated in the hydraulic system or communicates therewith relatively free of throttling.

In a particularly advantageous embodiment of the present invention, the throttled route configured as a throttle aperture in the membrane, so that the relatively unthrottled route, permitting displacement of only slight quantities of the hydraulic medium, and the relatively throttled route, principally open for any quantity of the hydraulic medium, are constructionally combined.

The membrane limiting the unthrottled displaceable quantity of the hydraulic medium is preferably housed in a membrane working chamber, in which the side facing the hydraulic system is arranged in series between a hydraulic pressure source such as, e.g., a pump, and a consumer, while both the pressure source and the consumer can represent a pulsation source. In this case, the membrane is situated in a space through which the hydraulic medium constantly flows so that the pulsations can be readily transmitted to the membrane. This is especially true when the inlets or outlets for the hydraulic medium in the space are situated approximately perpendicular to the plane of the membrane, and the direction of flow of the hydraulic medium must reverse between inlet and outlet.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
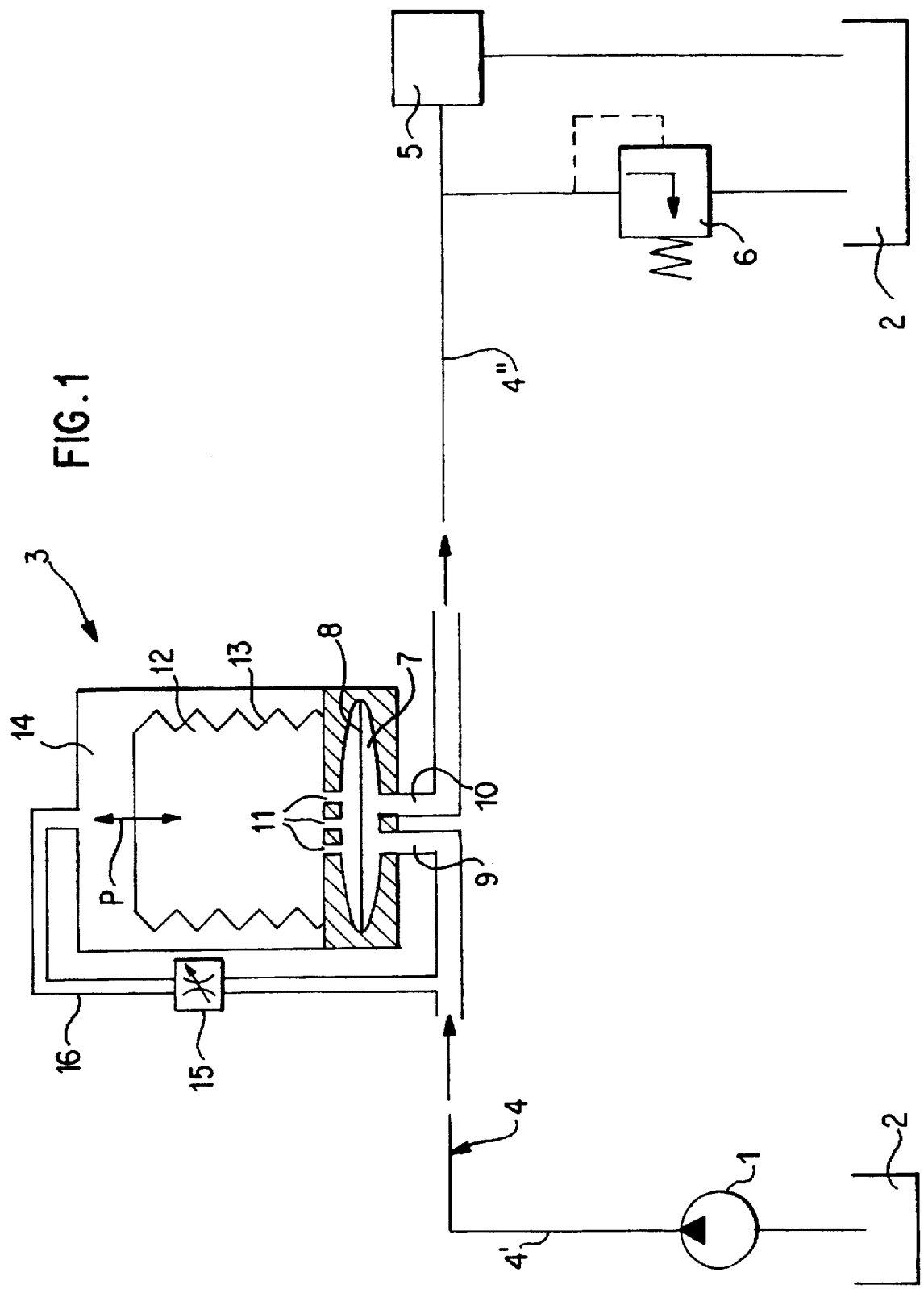
FIG. 1 is a schematic switching representation of a hydraulic system with a pulsation damper according to the present invention.

FIG. 1 shows a pulsating pump 1 such as, for example, a vane-cell pump, connected on the suction side with a reservoir 2 and on the pressure side, via a pressure line 4 leading to a pulsation damper 3, and a consumer 5, from which the introduced hydraulic medium can flow back to the reservoir 2. To limit the maximum pressure, a pressure control valve 6 can be incorporated in the pressure line. Depending upon the operational state of the consumer 5, significantly different working or operational hydraulic pressures can exist in the pressure line 4.

The pulsation damper 3 has a membrane working chamber 7 of essentially lens-like form. The chamber 7 is divided into two compartments by a plate-shaped membrane 8 located in the equatorial plane of the chamber 7. The lower compartment of the membrane working chamber 7 forms the hydraulic side of the plate membrane 8 and is connected with the pump-side part 4' of the pressure line 4 via an inlet channel 9 and with the consumer-side part 4" of the pressure line 4 via an outlet channel 10. The channels 9, 10 are connected near the central axis of the membrane working chamber 7, and are oriented essentially perpendicular to the plate membrane 8.

Figure 2:
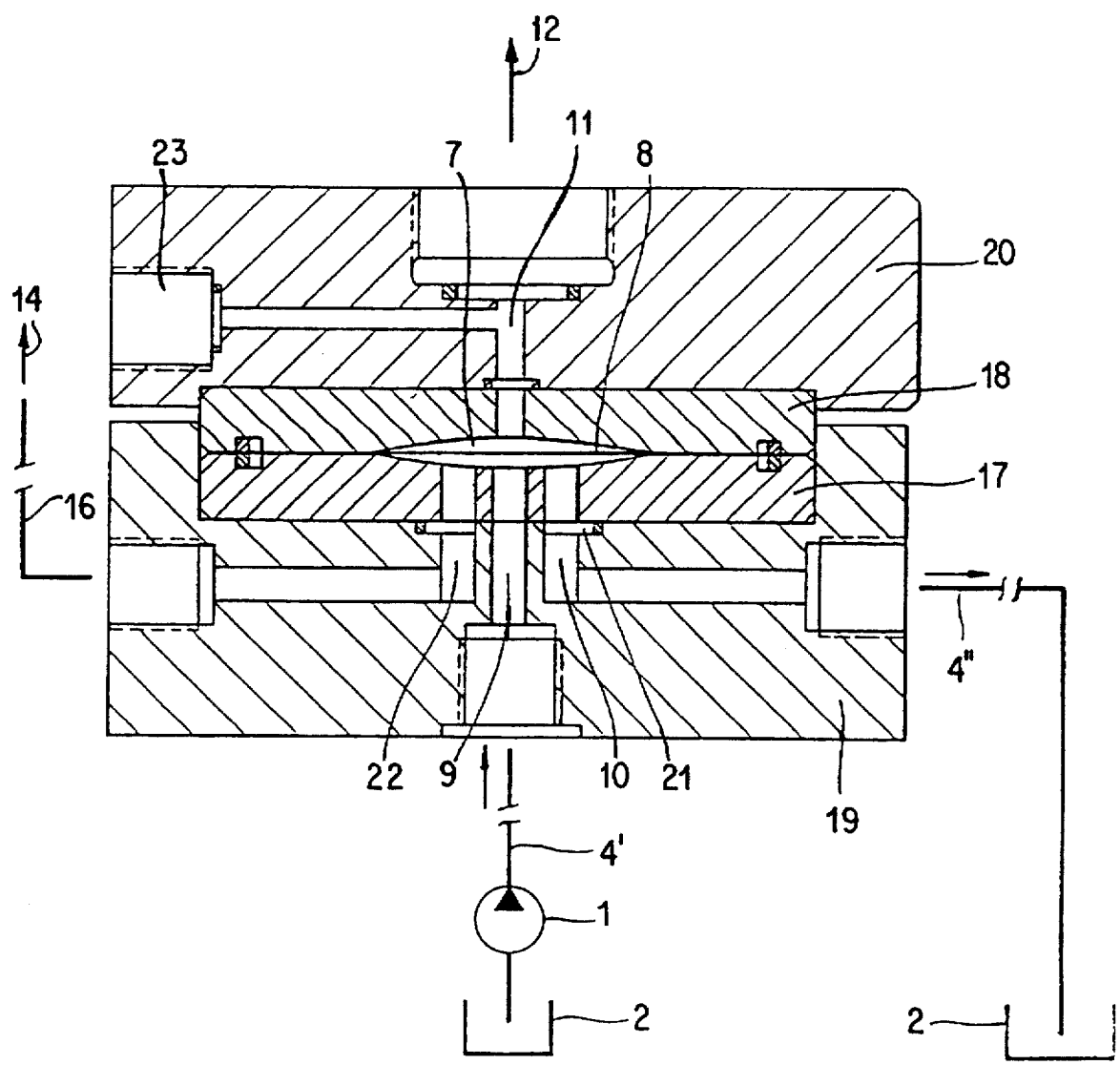
FIG. 2 is a cross-sectional view of the pulsation damper according to the present invention in the area of a membrane restricting the displaceable quantity of the hydraulic medium free of throttling.

The upper compartment of the membrane working chamber 7 forms the gas side of the plate membrane 8 and is connected, via channels 11, with a gas chamber 12 which is enclosed within a bellows-like pressure equalization membrane 13. The channels 11 are essentially perpendicular to the plate membrane 8 and located near the central axis of the membrane working chamber 7. It is also within the scope of the present invention to fill and withdraw a pneumatic medium into and from the gas chamber 12 via a filling line as seen in FIG. 2. The pressure equalization membrane 13 is contained within a chamber 14 which is connected, preferably via a hydraulic line 16 having an adjustable throttle 15, with the line part 4' of the pressure line 4.

The plate membrane 8 is under a certain elastic tension and, when deflected, attempts to return elastically to a medial position shown in FIG. 1. The bellows-like pressure equalization membrane 13 has, in comparison with the plate membrane 8, a negligible resilience in all operational states, i.e., the membrane 13 has a negligible deflection rate.

Normally, the plate membrane 8 occupies a position near the medial location shown in FIG. 1 because pressure equilibrium can be established, via the line 16, in the hydraulic medium of the pressure line 4 on the one side and in the hydraulic medium of the chamber 14 on the other side. Accordingly, the elastic characteristics of the plate membrane 8 are sufficient to adjust the membrane in the medial position.

When hydraulic pulsations then develop in the pressure line 4, the propagation of those pulsations in the direction of the chamber 14 is hampered by the throttle 15 in the line 16. The pulsations can then act only upon the plate membrane 8, since its hydraulic side communicates with pressure line 4 without throttling. Correspondingly, the plate membrane 8 oscillates with the pulsation frequency, whereby the pulsations are damped due to the volumetric elasticity of the enclosed gas 12.

With slow pressure changes in the pressure line 4, the pressure equalization membrane 13 moves up and down, as indicated by the double arrow P in FIG. 1, and thus adapts to the compression of the enclosed gas 12 when the pressure increases and with the expansion of the gas 12 when the pressure decreases. Inasmuch as the pressure equalization membrane 13 is configured to be readily movable, slower pressure changes in the hydraulic system, which are transmitted through the throttle 15 into the chamber 14 practically without delay, lead to no significant movements of the plate membrane 8.

With rapid changes in the hydraulic pressure in the line 4 and due to the throttle 15, a temporary pressure differential between the hydraulic pressure in the chamber 14 and the hydraulic pressure in the line 4, and on the hydraulic side of the plate membrane 8, will develop in the membrane working chamber 7 until sufficient hydraulic medium has been displaced through the throttle 15 for pressure equalization between the chamber 14 and the pressure line 4. To the extent that greater pressure differentials develop between the hydraulic medium on the hydraulic side of the plate membrane 8 and the hydraulic pressure in the chamber 14 and therefore the pneumatic pressure of the gas 12, the plate membrane 8 is maximally deflected, i.e., forced against the upper or the lower interior wall of the membrane working chamber 7. The walls then act temporarily as upper and lower impact or support surfaces for the plate membrane 8. In the case of a substantial brief increase in the hydraulic pressure in the line 4, neither the line 16 nor the membrane working chamber 7 can receive greater quantities of the hydraulic medium can be received from the line 4. This also means that, when necessary, the hydraulic pressure serving the consumer 5 can be quickly changed by the input or withdrawal of lesser quantities of hydraulic medium into or from the line 4. In this manner, a firm or steady coupling between the pressure source and the consumer is realized.

Although the pulsation damper of the present invention effectively and resiliently damps the pressure pulsations which are principally associated with high dynamic pressure changes, the pulsation damper of the present invention remains maximally unyielding and firm vis-a-vis occasionally desirable surge-like changes in the hydraulic working or operating pressure.

The damping action is enhanced by the fact that the inlet and outlet channels 9, 10 are arranged perpendicular to the plate membrane 8, so that reversal of flow direction of the hydraulic medium takes place between the inlet and outlet channels 9, 10 on the hydraulic side of the membrane working chamber 7, and the pulsations associated with the pressure waves are reflected with substantial weakening or extinction by the plate membrane 8 resiliently supported by the gas 12.

By adjustment of the throttle 15, the yielding of the pulsation damper can be adjusted during rapid changes of the operating pressure in line 4. The greater the throttle resistance, the more rigid the hydraulic coupling between pump 1 and consumer 5 becomes. However, with rapid changes of the hydraulic operating pressure in the line 4, the plate membrane must be allowed temporarily to reach a final position, and thus become immobile, because no adequate pressure equalization has taken place between chamber 14 and pressure line 4 by the throttle 15. Thus, temporarily pulsations cannot be damped. The lower the throttle resistance of throttle 15, the more rapidly a pressure equalization can take place between the chamber 14 and the pressure line 4. However, one must allow for a decrease in the rigidity of the hydraulic coupling between the pump 1 or the pressure source and the consumer 5. On the other hand, pulsation damping also remains possible under relatively rapidly changing hydraulic operating pressures.

FIG. 2 shows in more detail the membrane working chamber 7 and associated parts. The membrane working chamber 7 is formed between two adjoining plates 17, 18, which themselves are clamped between two plate-like parts 19, 20. Basically, however, it is both possible and advantageous that the parts 17, 19 on the one hand and the parts 18, 20 on the other hand each be a common single-piece part.

Both the plate 17 and the plate-like part 19 have a bore coaxial to the central axis of the plate membrane 8. The bore forms the inlet channel 9 or a connection for the line part 4' of the pressure line. Concentric to this central bore is an annular groove 21 on the side of the plate-like part 19 facing the plate 17. The groove 21 communicates with bores which are arranged in the plate-like part 19 and the plate 17 parallel to the bores forming the inlet channel 9. These bores leading out from the annular groove 24 form the outlet channel 10 which is joined, via a comparable connecting bore, with the line part 4" of the pressure line 4. A channel 22 is formed by at least one of these bores, which channel 22 is joined, via a comparable connecting bore with the hydraulic line 16 leading to the chamber 14 as also seen in FIG. 1.

Bores concentric to the central axis of the membrane 8 are provided in both the plate 18 and the plate-like part 20 and form the channel 11, via which the portion of the membrane working chamber 7 remaining above the membrane 8 communicates with the gas chamber 12 as previously described with respect to FIG. 1. Branching off from the channel 11 is a connection 23, via which the quantity of the pneumatic medium in the gas chamber 12 can be altered or the gas chamber 12 can be filled.

Figure 3:
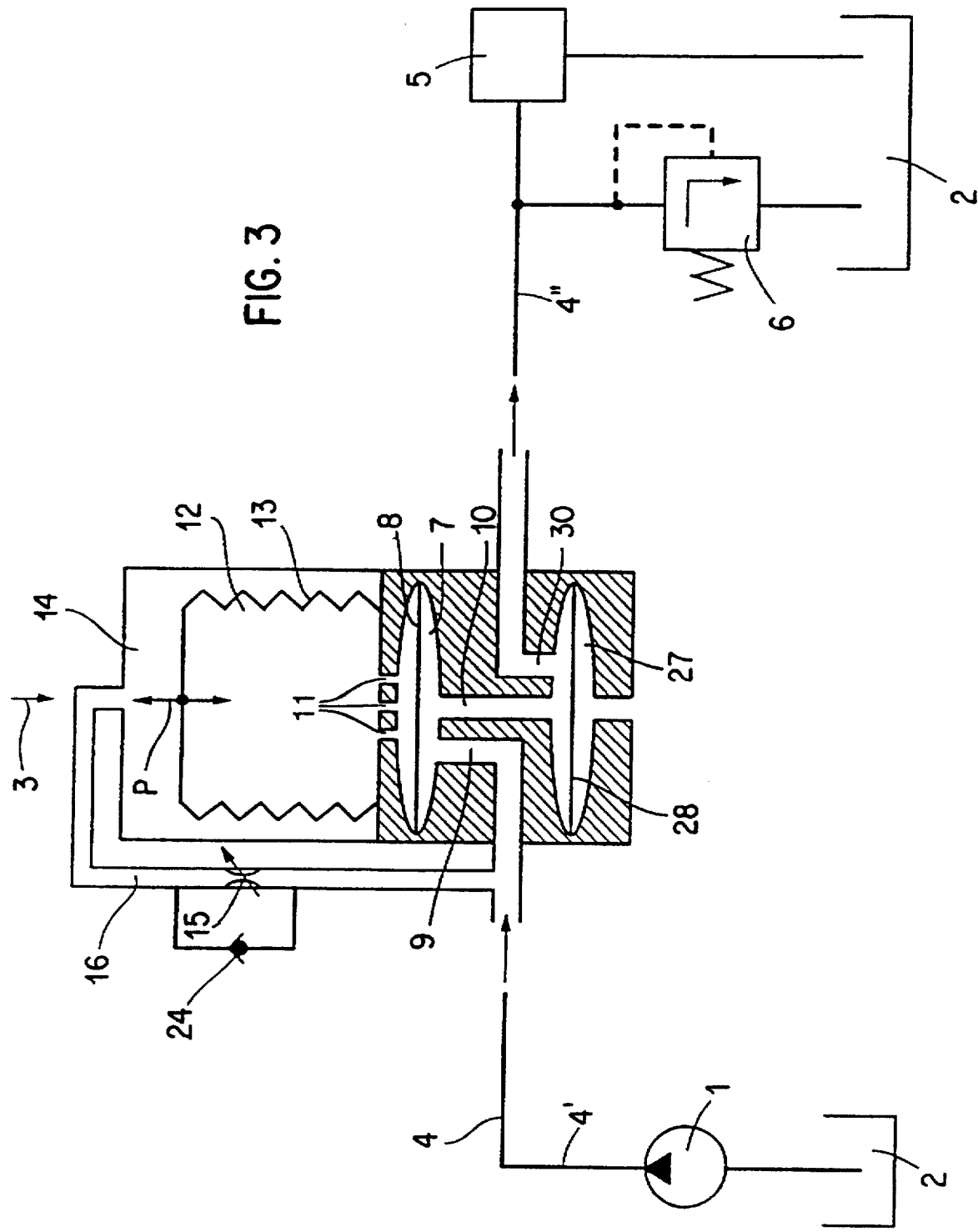
FIG. 3 is a schematic similar to FIG. 1 but of a second embodiment of the present invention.

The embodiment of FIG. 3 differs from that illustrated in FIG. 1 primarily in that a return valve 24 is arranged parallel to the throttle 15. The return valve 24 opens in the direction of the pressure line 4 whenever a rapid pressure decrease takes place there in comparison with the pressure in the chamber 14. As a result, it is possible for an eventual pressure decrease in the line 4 to be quickly transmitted to the chamber 14. This makes it possible, in the event of a rapid pressure decrease in the line 4, shown in FIG. 3, to prevent the membrane 8 from being temporarily forced against the lower wall of the membrane working chamber 7 and rendered inoperative to provide damping.

Additionally, the outlet channel 10 of the membrane working chamber 7 shown in FIG. 3 forms an additional, similar membrane working chamber 27 with a plate-like membrane 28 which is acted upon by atmospheric pressure on its side opposite the hydraulic system. The outlet 30 of the membrane working chamber 27 is then connected with the line part 4" of the pressure line 4. With higher hydraulic operating pressures, the gas chamber 12 must have a precharged gas pressure to assure that the gas chamber 12 has an adequate volume with higher operating pressures in the hydraulic system. At the same time, however, the membrane 8 will constantly be in its lower end position against the lower wall of the membrane working chamber 7 when the hydraulic pressure in the line 4 drops below the precharged gas pressure. With such low hydraulic pressure, the pneumatic medium in the gas chamber 12 can no longer provide damping action. The membrane 28 is so dimensioned that it assumes a medial position in the membrane working chamber 27 when such low pressures prevail, and can then provide damping against the atmospheric pressure when pulsations occur. As soon as the hydraulic operating pressure increases, the membrane 28 moves against the lower wall of the membrane working chamber 27 and becomes incapable of damping.

Alternatively, a pneumatic medium or a vapor with minimal pressure can be sealed beneath the membrane 28 in the membrane working chamber 27 in lieu of using atmospheric pressure. Fundamentally, this changes nothing in regard to the functioning of the embodiment of FIG. 3. In the movement of the membrane 28, a more or less pronounced pressure change then occurs on the gas side of the membrane 28.

Figure 4:
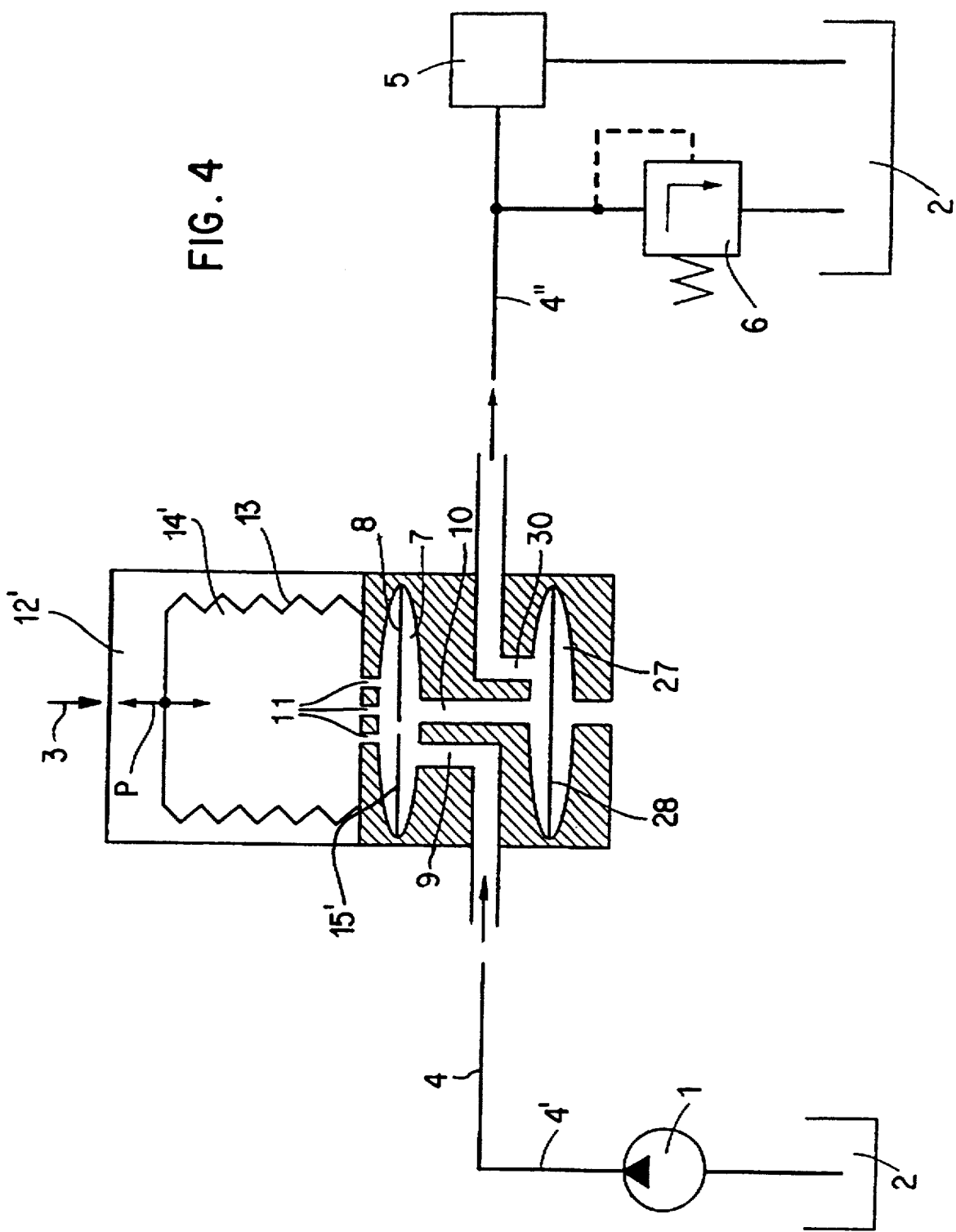
FIG. 4 is a schematic similar to FIG. 1 but of a third embodiment of the present invention.

The embodiment of FIG. 4 differs essentially from those in FIGS. 1 and 3 in that the line 16 is removed and the space 14' between the membrane 8 and the membrane 13 is filled with hydraulic medium, and the space 14' communicates via a throttle aperture 15' in the membrane 8 with the pressure line 4. In addition, the gas chamber 12' is situated outside the membrane 13 in the pulsation damper 3.

Accordingly, a rapid transfer of hydraulic medium between the line 4 and the hydraulic chamber 14' is avoided during substantial changes in the hydraulic operating pressure because the membrane 8 is temporarily forced into an end position against the upper or lower wall of the membrane working chamber 7 and only a little hydraulic medium can flow from the pressure line 4 to the membrane working chamber 7 or from the membrane working chamber 7 to the line 4. This ensures a firm coupling between the pump 1 or the pressure source and the consumer 5. As soon as a pressure equilibrium has been established between the hydraulic chamber 14' and the pressure line 4 and as soon as the membrane 8 has again assumed a position away from the walls of the membrane working chamber 7, pressure pulsations can be transmitted unthrottled via the membrane 8 into the hydraulic chamber 14, since the membrane 8 is then able to oscillate freely. Accordingly, the gas chamber 12' becomes capable of damping due to its volumetric elasticity.

In the embodiment of FIG. 4, it is important that the channels 11 be maximally free of throttling fundamentally in the same manner as the inlet and outlet channels 9, 10, i.e., that they have minimal hydraulic induction. The effectiveness of the damping by the gas chamber 12' is thereby improved.

In order to achieve good support in the end positions of the membrane 8, especially with higher pressure differentials acting upon the membrane 8, a number of channels, each of minimal diameter yet with a great total diameter, can be provided in order to make possible, on one hand, freedom from throttling and, on the other hand, uniform support for the membrane 8.

According to yet another embodiment, the line 16 shown in FIGS. 1 and 3 connecting the chamber 14 with a separate hydraulic pressure source can be eliminated, wherein it is ensured, by way of direct regulation of the pressure source and/or by way of pressure control valves between the separate pressure source and the chamber 14, that the hydraulic pressure in the chamber 14 agrees with the hydraulic pressure in the pressure line 4. For this purpose, a pressure measurement device can be installed. Such an arrangement can be especially practical in double-circuit systems. The other circuit in each case then acts as the separate pressure source for the chamber 14 of the one hydraulic circuit.

A presently preferred embodiment of the present invention is in an application to motor vehicle hydraulic servo systems such as, e.g., power steering systems, in which the pulsation damper can then also provide damping on the pressure side of the power steering pump whenever the medial hydraulic pressure changes. Such pressure changes develop, for example, when the steering shifts from the straight-ahead setting to a turn to the right or left. Otherwise, the pump 1 in such servo systems functions regularly with a variable conveying speed, since the pump 1 is driven directly by the vehicle motor, the rotary speed of which is itself dependent upon the driving speed and given transmission in the drive train. Even when the pump is combined with a hydraulic flow regulator, certain pressure fluctuations can still occur.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A hydropneumatic pulsation damper for hydraulic systems subject to pulsations of hydraulic medium with variable operating pressure, comprising a chamber configured to be coupled with the hydraulic system and a vapor or gas medium enclosed in said chamber and exposed to the hydraulic medium pulsations, said vapor or gas medium forming a volumetrically elastic cushion being impacted by the hydraulic pressure via a relatively unthrottled first connection so as to permit displacement of only a minimum quantity of the hydraulic medium, and via a throttled second connection to permit displace of quantities of the hydraulic medium substantially greater than the minimum quantity of the hydraulic medium, and said chamber being operatively configured as a hydraulic area connected with the hydraulic system via at least the throttled second connection and a gaseous area divided from the hydraulic area by a separator having substantial movability and low movement resistance.

2. The damper according to claim 1, wherein, within the relatively unthrottled connection, a membrane is operatively arranged.

3. The damper according to claim 2, wherein the membrane is arranged to be impacted on one side thereof by the hydraulic medium.

4. The damper according to claim 2, wherein the membrane is of plate-like configuration and is arranged in an equatorial plane of a substantially lens-shaped membrane working chamber forming an upper impact surface for the membrane on one side of the membrane and a lower impact surface on the other side of the membrane.

5. The damper according to claim 2, wherein a side of the membrane facing the hydraulic system is configured to restrict displacement of the hydraulic medium flowing therethrough via a separate inlet and outlet perpendicular to a plane of the membrane, with the flow reversing between the inlet and the outlet.

6. The damper according to claim 2, wherein the membrane is arranged to be impacted on both sides thereof by the hydraulic medium and to separate two hydraulic areas communicating via the throttled connection, one of the hydraulic areas being located so as to be within the chamber filled with the hydraulic medium and communicating therewith relatively unthrottled, and the other of the hydraulic areas being located so as to be within the hydraulic system or communicating therewith relatively unthrottled.

7. The damper according to claim 6, wherein the throttled connection is configured as a throttle aperture in the membrane.

8. The damper according to claim 1, wherein a return valve operable to open in a direction of the hydraulic system, is operatively arranged in parallel with the throttled connection.

9. The damper according to claim 1, wherein the separator is a bellows.

10. The. damper according to claim 1, wherein the separator is a membrane.

11. The damper according to claim 1, wherein the separator is a bubble.

12. The damper according to claim 1, wherein the separator is a piston.

13. The damper according to claim 1, wherein the relatively unthrottled connection provides substantially only slow pressure changes, relative to the pulsations, in the chamber.

14. The damper according to claim 1, wherein a separate pressure source is provided for supplying the hydraulic pressure to the chamber.

15. The damper according to claim 1, wherein the vapor or gas medium has predetermined precharged pressure.

16. The damper according to claim 15, wherein an additional pulsation damper is configured to cause damping of substantially only the precharged pressure and to accept only the minimal quantity of the hydraulic medium.

17. The damper according to claim 16, wherein the additional pulsation damper has a membrane of limited mobility with one side arranged to be impacted by the hydraulic medium and another side to be acted upon by atmospheric pressure or the precharged pressure.

* * * * *